United States Patent [19]

Kimizuka et al.

[11] Patent Number: 4,741,914

[45] Date of Patent: May 3, 1988

[54] FLAVOR ENHANCING SEASONING CONTAINING DEODORIZED GARLIC EXTRACT AND PROCESS

[75] Inventors: Akimitsu Kimizuka, Yokohama; Youichi Ueda; Makoto Sakaguchi, both of Kawasaki; Ryuichi Miyajima, Yokohama, all of Japan

[73] Assignee: Ajinomoto Co., Inc., Tokyo, Japan

[21] Appl. No.: 848,349

[22] Filed: Apr. 4, 1986

Related U.S. Application Data

[63] Continuation of Ser. No. 670,577, Nov. 13, 1984, abandoned.

[51] Int. Cl.$^4$ .................... A23L 1/228; A23L 1/229
[52] U.S. Cl. .................... 426/537; 426/638; 426/650; 426/655; 426/651; 426/431
[58] Field of Search ............ 426/537, 638, 655, 650, 426/651, 431

[56] References Cited

U.S. PATENT DOCUMENTS

| | | | |
|---|---|---|---|
| 3,690,900 | 9/1972 | Marumoto et al. | 426/537 |
| 4,258,072 | 3/1981 | Eguchi et al. | 426/537 |
| 4,377,600 | 3/1983 | Morinaga | 426/650 |
| 4,472,447 | 9/1984 | Mizutani et al. | 426/537 |
| 4,514,431 | 4/1985 | Buckholz et al. | 426/650 X |

FOREIGN PATENT DOCUMENTS

| | | | |
|---|---|---|---|
| 46-34744 | 10/1971 | Japan | 426/638 |
| 51-026241 | 3/1976 | Japan | 426/638 |
| 52-043901 | 11/1977 | Japan | 426/655 |
| 55-007222 | 2/1980 | Japan | 426/655 |
| 57-186453 | 11/1982 | Japan | 426/638 |
| 57-198065 | 12/1982 | Japan | 426/638 |
| 0116653 | 7/1983 | Japan | 426/650 |
| 0032578 | 7/1983 | Japan | 426/638 |

*Primary Examiner*—Joseph Golian
*Attorney, Agent, or Firm*—Oblon, Fisher, Spivak, McClelland & Maier

[57] ABSTRACT

A flavor enhancing seasoning is disclosed, which is prepared by blanching garlic, and extracting the blanched product with water. The extract produced may be deodorized and concentrated, to provide a seasoning additive that dramatically improves flavor fullness, depth and duration, and can be advantageously combined with flavor intensifiers such as MSG.

13 Claims, No Drawings

FLAVOR ENHANCING SEASONING CONTAINING DEODORIZED GARLIC EXTRACT AND PROCESS

This application is a continuation of application Ser. No. 670,577, filed Nov. 13, 1984, now abandoned.

BACKGROUND OF THE INVENTION

1. Field of the Invention

This invention relates to a process for the production of flavor enhancing seasonings (or materials) having a flavor enhancing effect by deodorizing a water extract of garlic treated by blanching.

2. Background of the Prior Art

The taste intensity imparting function of representative flavor intensifying substances, namely, sodium L-glutamate (MSG), sodium 5'-inosinate (IMP) and sodium 5-guanylate (GMP) is widely known, and a wide variety of seasonings obtained from such MSG, IMP and GMP appropriately combined with protein hydrolystates (HVP, HAP, yeast extract), amino acids, etc. according to the intended application have been used in increasing amounts for the purpose of enhancing organoleptic characteristics such as flavor intensification.

On the other hand, although these substances enjoy popularity and wide applications, there has still been a demand for extending the function to impart improved flavor enhancement, the so-called roundness of flavor, that is, an amplification of all aspects of the flavor including depth and duration, etc. in a fashion different from the effect achieved by a combination of saltiness, sweetness, acid taste etc. in order to further enhance a taste.

In the course of an intensive study for the purpose of further extending the function of the conventional seasonings and developing all-purpose seasonings having an enhanced flavor amplification function, in particular, in pursuit of the taste intensifying function inherent to various food materials, the present inventors have paid attention to the organoleptic characteristics possessed by garlic. Heretofore, garlic has been popular for its characteristic flavor, especially for its savory aroma generated when heated together with oil and has been widely employed as a spice. Although there has been a great deal of research regarding the functions of garlic, in particular, e.g. its odor components, antibacterial properties, physiological activity, sulfur-containing compounds, γ-glutamylpeptides, etc., there is hardly any knowledge of the nature of the substances responsible for the characteristic taste of garlic, except the following several findings; Japanese Patent Application Laid-Open No. 7468/1977 describes that S-allylcysteine enhances the garlic or onion-like taste and Japanese Patent Publication No. 49708 discloses that the crystals obtained by removing the soluble proteins from an alcohol extract of garlic, the enzymes of which have been deactivated, then inducing the precipitation thereof as a heavy metal salt and purifying the component in the filtrate have the taste and odor of garlic. However, with the former, although a garlic-like taste is manifested, the taste intensity is weak, while with the latter, both garlic taste and odor are present but it is impossible to obtain the effect of the taste alone and separate from the odor.

Known sulfur-containing amino acids, peptides and γ-glutamylpeptides contained in garlic are cysteine, S-methylcysteine, methionine, S-methyl-L-cysteine sulfoxide, S-allylcysteine, S-ethyl-L-cysteine sulfoxide, methionine sulfoxide, S-propyl-L-cysteine sulfoxide, allicin, S-propenyl-L-cysteine sulfoxide, S-allylmercapto-L-cysteine, S-(2-carboxypropyl)cysteine, γ-glutamyl-S-methyl-L-cysteine, γ-glutamyl-S-allylcysteine, γ-glutamyl-S-propylcysteine, γ-glutamyl-S-allylcysteine, γ-glutamylphenylalanine, glutathione, S-(2-carboxypropyl)glutathione, γ-glutamyl-S-β-carboxy-β-methylethylcysteinylglycine etc., and it is known that diallyldisulfide, allicin as a hot taste substance, γ-glutamyl-S-allylcysteine as an odor precursor, etc. are involved as the characteristic components for the odor of garlic. However, the relationship between these components and the taste intensity is unknown except for findings on the above-described S-allylcysteine. For example, as regards allicin which is contained in garlic in an amount of 0.8–0.9% and is considered as a representative component, no finding is present even on whether it actually has a taste intensifying function (in this connection, the present inventors have confirmed that allicin has a taste intensifying power and yet that allicin cannot be said to be the sole taste intensifying component).

SUMMARY OF THE INVENTION

The garlic component obtained by the process of this invention, prepared by blanching garlic and thereafter extracting the garlic with water, deodorizing and concentrating the extract, presumably composed mainly of amino acids and peptides as determined by NMR, exerts a specific flavor enhancement effect without being accompanied by the garlic odor. In particular, in a mixed system with other taste intensifying components, the present component adds the so-called amplitude, thickness, continuity to the intensity of the other co-present components. For example, when the product of the process of this invention is added to a mixed aqueous solution of MSG and IMP, an improvement of the depth and lasting effect of the taste intensity itself are distinctly detected, and thus the improved roundness of flavor is clearly different from the flavor intensification imparted by MSG and IMP alone.

DETAILED DESCRIPTION OF THE INVENTION

The invention can be further understood by reference to the following Examples.

EXPERIMENT EXAMPLE A

Using (1) S-methylcysteine, (2) S-ethylcysteine, (3) a garlic extract obtained by peeling garlic, boiling at 90° C. for 30 minutes, extracting with hot water for 60 minutes, treating the filtrate by a strong-acid cation exchange resin ("Duolite C-25D" produced by Diamond Shamrock Chemical Co.), concentrating the adsorption eluate and decoloring it with active carbon followed by concentration and drying, and (4) a garlic extract obtained by boiling, extracting with hot water and treating with a strong-acid cation exchange resin under the same conditions as in (3), then concentrating the non-adsorbed liquor and decoloring with active carbon followed by concentration and drying, 0.2% aqueous solutions of the respective samples (1)–(4) and aqueous solutions of 0.05% of MSG and 0.05% of IMP dissolved in said respective 0.2% solutions were prepared as sample solutions and organoleptic evaluation was conducted.

TABLE 1

Results of Organoleptic Evaluation of 0.2% Aqueous Solutions of Respective Samples

|  | N = 20 | |
| --- | --- | --- |
|  | Taste Intensifying Power | Strength of Odor |
| 0.2% Aqueous Solution of: | | |
| S—Methylcysteine | ± | — |
| S—Ethylcysteine | ± | — |
| Garlic extract (Adsorbed part) | ++ | — |
| Garlic extract (Non-adsorbed part) | — | ++ |

TABLE 2

Results of Organoleptic Evaluation of Aqueous Solutions of 0.05% MSG, 0.05% IMP and 0.2% Respective Samples

|  | N = 20 | |
| --- | --- | --- |
|  | Taste Intensifying Power | Strength of Odor |
| Aqueous solution of 0.05% MSG and 0.05% IMP (Control) | + | — |
| Aqueous solution of 0.05% MSG, 0.05% IMP and 0.02: | | |
| S—Methylcysteine | ++ | — |
| S—Ethylcysteine | ++ | — |
| Garlic extract (Adsorbed part) | ++++ | — |
| Garlic extract (Non-adsorbed part) | + | ++ |

+ Definitely Observed
± Marginally Observed
— Not Observed

In the process of this invention, the blanching of garlic is effected before the extraction with water. If garlic is previously smashed and then extracted with water under conditions where the enzymatic action adequately proceeds, it is essential to deactivate the enzymes by blanching, because otherwise it is difficult to obtain a final product having a stabilized taste intensifying power. Therefore, garlic must be blanched whole, or where garlic is chopped, it must be blanched within 6 hours after the chopping treatment or rapidly chilled or frozen and blanched just before the extraction. This blanching constitutes an essential pretreatment step in the production of an all-purpose flavor enhancement seasoning having stable flavor enhancement properties and taste intensifying power. (On conducting the water extraction, where it is possible to suppress the enzymatic action by the use of e.g., an enzymatic action inhibitor, etc., the blanching before the extraction is not always necessary. In other words, "to previously conduct blanching" also covers application of any method which enables extraction under conditions where no enzymatic action proceeds at the time of the extraction with water). The above chopping treatment is not limited to trituration, grinding and the like treatments but also covers any physical treatment by which the enzymatic reaction can proceed.

While the blanching may be effected by any method, more specifically, a method of heating garlic whole is effective. By heating methods such as boiling, roasting, frying, deep-frying, steaming, etc. and, as heating conditions, by applying heating conditions corresponds to heating at 80° C. for 30 minutes or longer, the enzymes may be adequately deactivated. However, it is not preferred to employ severe heating conditions because a burnt odor can be caused thereby.

The extraction with water may be effected by e.g., grinding blanched garlic (either directly or after drying, freezing, etc.), adding it to water, dispersing it uniformly therein, and filtering to obtain a water extract. The grinding may be effected not only before the addition to water but also by adding garlic whole to water and chopping therein using, e.g., a homogenizer. Further, where garlic has been chopped before the blanching, it may be directly extracted with water. The extraction may be effected regardless whether heating is applied or not, but heating is preferred, and a water temperature of 40°–100° C. or so is suitable. The time required for the extraction is at least 10 minutes.

After the extraction, the water insoluble components are separated by filtration, centrifugation, etc., and further, clarifying filtration is conducted if necessary. In this separation step, it is preferred to separate and remove acidic polysaccharides such as pectin, etc. by the use of a pH adjusting agent in order to eliminate diverse taste and effects other than that desired and to enhance the efficiency of the subsequent deodorizing step. In this case, the pH may be adjusted to pH 3 or below with an inorganic acid or an organic acid.

The thus obtained water extract of garlic is further subjected to deodorizing and concentrating treatments thereby making it completely or almost completely odorless and, at the same time, fractionating and concentrating the component having a flavor enhancing imparting effect from the water extract of garlic. Specifically, the following methods are desirably employed:

(1) Fractionation using a strong-acid cation exchange resin:

Using such resins as "Dowex 50W" (produced by Dow Chemical Co.), "Duolite C-25D" (produced by Diamond Shamrock Chemical Co.), "Amberlite IR-120" (produced by Rohm & Haas Co.), "Diaion-SK-1B" (produced by Mitsubishi Chemical Industries, Co.) etc., the resin as a free form, i.e. an H-form, and is brought into contact with the water extract of garlic. Since the amount of the ion exchange resin used depends on the kind of the resin, etc., the optimal amount used is established each time. Examples of methods for bringing the ion exchange resin into contact with the water extract of garlic include a method which comprises filling a column with the ion exchange resin and passing the water extract of garlic therethrough, a method which comprises adding the ion exchange resin to the water extract of garlic, etc. In this method the flavor enhancement imparting component is present in the adsorbed fraction while the non-adsorbed fraction contains sweetness and acidic taste components but has no flavor enhancement imparting effect. Therefore, it is preferred to previously separate and remove the non-adsorbed liquor, then elute the adsorbed part with an alkaline agent to collect an adsorption eluate, and concentrate the eluate by a suitable method such as membrane concentration, concentration by distillation, etc. There is no general standard for the degree of concentration because it can vary depending on the kind of intended seasoning. Further, this concentration can even sometimes be omitted, if the intended seasoning is, e.g., a liquid. Furthermore, it is also possible to add a decoloring treatment using, e.g., active carbon before and/or after the deodorizing and concentrating steps. The deodorized concentrate or the deodorized and decolored concentrate may optionally be dried or powdered by e.g., freeze drying, if necessary.

(2) Fractionation by molecular sieve membrane treatment:

Fractionation is effected using a membrane which can fractionate the molecular weight, such as dialysis membranes having a molecular cut of 800–2,000, ultrafiltration membranes, reverse osmosis membranes having a sucrose rejection rate of 5–80% etc., e.g., "SPECTRUM Por 6.132640" (produced by Medical Industry Co.), "TI 215" (Produced by Teijin Engineering Co.) etc. In this case, since the flavor enhancing component is present in the lower molecular weight fraction (average molecular weight of 2,000 or less, preferably 800 or less), the membrane treatment is repeatedly conducted, or combined with other fractionation methods, the lower molecular weight fraction is collected, and is concentrated (and decolored and dried if necessary) similarly as in (1).

(3) Fractionation by steam distillation:

The flavor component is separated and removed by steam distillation under normal or reduced pressure. Since the flavor enhancement imparting component is present in the residual liquor part, this residual liquor is concentrated (and decolored and dried if necessary) by procedures similar to those in (1).

While the water extract of garlic may be deodorized and concentrated by the above-described methods and the like, the deodorizing method is not limited to the methods disclosed above. Further, it is preferred to remove as much flavor part as possible and fractionate the odorless section mainly comprising the flavor enhancement imparting component by repeatedly conducting deodorization or by combining two or more methods for deodorization. No conventional garlic deodorizing methods are known where the deodorization is conducted after the enzyme deactivation treatment by the above-described ion exchange resin treatment, membrane treatment etc., nor where the flavor enhancement imparting effect is confirmed and the fraction mainly comprising this flavor enhancement imparting effect is fractionated for making into a seasoning or a seasoning material.

The thus obtained water extract of garlic containing the flavor enhancement imparting component is, after the pH adjustment, if necessary, presented as a seasoning or a seasoning material in the form of an aqueous solution, paste, powder, granules, etc.

The product obtained by the process of this invention is completely or almost completely odorless and does not give a garlic odor. When this is tasted singly, there is no strong taste such as that obtained by MSG, or a nucleic acid type taste intensifying component, or a combination of both, and the present product manifests a remarkable flavor enhancing effect only when added to food, that is, in the co-presence of the taste intensifying component in food. Specifically, when added to a mixed system of MSG and a nucleic acid type taste intensifying component such as IMP, GMP etc., although there is no effect to further intensify the taste beyond the influence of IMP, GMP etc. with MSG, it can be distinctly detected that the depth and fullness of flavor is enhanced. Therefore, by adding the product of this invention to food either singly as a seasoning or in combination with an excipient as needed, it is possible to enhance the flavor itself without increasing basic taste such as saltiness, sourness, (MSG-like) taste.

In addition, various seasonings may be prepared using in combination other taste intensifying seasoning, for example, MSG and other glutamic acid salts (potassium salt, calcium salt etc.), IMP, GMP and other 5'-ribonucleotide salts (potassium salt, calcium salt etc.), other amino acids (salts), organic acids (salts), protein hydrolysates (HVP, HAP, yeast extract etc.), animal and vegetable extracts, table salt, potassium chloride, sugars etc., or also using flavor components, spices, flavors etc. Among those, since the glutamic acid salts such as MSG etc. and the 5'-ribonucleotide salts such as IMP, GMP etc. are versatile as flavor intensifying seasonings, combinations of these with the products of this invention are preferable. In particular, where the products of this invention are combined in mixed systems of MSG and IMP and/or GMP, there is obtained enhancement of the flavor, that is, the depth, roundness and duration of the taste intensity, which cannot be obtained with either system of an MSG single product, IMP and/or GMP, or a combination of MSG and IMP. In this case, if the mixing ratio of the product of this invention to MSG, IMP and/or GMP is 5 or more relative to the weight of the mixture of MSG and IMP (and/or GMP) taken as 100, flavor enhancement is manifested, but in view of the total balance of the taste intensity, a preferred range is 10–200.

TABLE 3

Effect of Addition of the Product of This Invention to MSG Solution, IMP Solution or MSG-IMP Mixed Solution

N = 16

|  | MSG (0.05%) Product of the Invention (0.05%) | IMP (0.05%) Product of the Invention (0.05%) | MSG (0.05%) IMP (0.05%) Product of the Invention (0.05%) |
|---|---|---|---|
| Strength of Flavor Enhancement as Compared with the Product not Incorporating the Product of the Invention | + | ++ | ++++ |

TABLE 4

Relationship between the Amount Added to Mixed Solutions of 0.05% MSG and 0.05% IMP and Strength of Flavor Enhancement

N = 20

| Amount of the Product of the Invention Added | 0 | 0.001 | 0.005 | 0.01 | 0.05 | 0.1 | 0.2 | 0.5 |
|---|---|---|---|---|---|---|---|---|
| Flavor Enhancement* | | − | + | ++ | ++++ | ++++ | ++++ | +++++ |

*Strength as compared with the case where no sample was added.

This invention is more particularly described by the following examples.

EXAMPLE 1

100 kg of garlic was cored, and 98 kg of the coreless garlic was heated in an autoclave at 115° C. for 40 minutes, thereby effecting steaming and deactivation of the enzymes. The autoclave-treated garlic was extracted while boiling using 150 l of water in a Rheokneader ® (manufactured by Kajiwara Industries, Co. Ltd.) at 90° C. for 30 minutes. Thereafter, 230 l of this boiled liquor was primarily separated using a press and 50 kg of the residue was removed. The obtained primarily separated liquor was adjusted to pH 1.0 with hydrochloric acid, then allowed to stand overnight at room temperature, and, after adding 0.5% of a filtering aid "Radiolite #600" (diatomaceous earth, produced by Showa Chemical Industries Co., Ltd.), subjected to secondary separation by filtration under pressure, to remove the residue containing acidic polysaccharides. 180 l of this secondarily separated liquor was passed through a resin column packed with 80 l (water swollen state) of a strong-acid cation exchange resin "Duolite-C-25D" (produced by Diamond Shamrock Chemical Co.) coupled with a resin column packed with 8 l (water swollen state) of a weak-acid cation exchange resin "Amberlite IRC-50" (produced by Rohm & Haas Co.) at a rate of 16 l per hour. The columns were then washed with 240 l of water, and thereafter the adsorbed component was eluted with 0.5N sodium hydroxide until the pH of the whole eluate became 6.8. This adsorption eluate was preliminarily concentrated by a reverse osmosis membrane unit at a pressure of 50 kg/cm$^2$ and a temperature of 50° C. 40 l of this preliminary concentrate was further concentrated to 10 l using a rotary evaporator, active carbon was added thereto at a rate of 2.0% based on the solids content of the concentrate, which was then allowed to stand overnight while occasionally stirring and the active carbon was filtered off. This active carbon-decolored solution was freeze dried to obtain 500 g of a white and almost odorless dry product (product of the invention (1)).

In another embodiment, 98 kg of previously cored and chopped garlic was directly boiled with water in a Rheokneader ® (maufactured by Kajiwata Industries, Co. Ltd.) at 90° C. for 90 minutes without the autoclave treatment, then the insoluble residue was separated and removed by centrifugation to obtain a filtrate, which was then subjected to adsorption resin treatment and further to concentration and freeze drying to obtain a dry product (product of the invention (2)). Similarly, a dry product (control section) was prepared by the same procedures as those for the above product of the invention (1) except that the adsorption resin treatment was omitted. Using these three garlic extract dry products thus obtained, organoleptic evaluation by a profile method was conducted on 0.2% aqueous solutions of the respective samples and mixed solutions of 0.05% of MSG, 0.05% of IMP and 0.05% of the respective samples by an organoleptic panel consisting of 16 well-trained members. The results are given in Table 5 and Table 6.

TABLE 5

Taste Evaluation of 0.2% Aqueous Solutions of Respective Samples (Strength relative to the case where no sample was added)

|  | Product of the Invention (1) | Product of the Invention (2) | Control Section |
| --- | --- | --- | --- |
| Strength of Odor and Flavor Original Taste | ± | ± | +++ |
| Strength of Sweetness | ± | ± | ++ |
| Strength of Acid Taste | ± | ± | ± |
| Strength of Saltiness | ± | ± | ± |
| Strength of Bitterness | ± | ± | + |
| Strength of Taste Intensity | ± | ± | ± |

TABLE 5-continued

Taste Evaluation of 0.2% Aqueous Solutions of Respective Samples (Strength relative to the case where no sample was added)

|  | Product of the Invention (1) | Product of the Invention (2) | Control Section |
| --- | --- | --- | --- |
| Flavor Enhancement |  |  |  |
| Fullness | + | + | + |
| Extent | + | + | + |
| Duration of Taste | + | + | + |

TABLE 6

Taste Evaluation of Mixed Aqueous Solutions of 0.05% MSG, 0.05% IMP and 0.05% Respective Samples (Strength relative to the case where no sample was added)

|  | Product of the Invention (1) | Product of the Invention (2) | Control Section |
| --- | --- | --- | --- |
| Strength of Odor and Flavor Original Taste | + | ± | +++ |
| Strength of Sweetness | ± | ± | + |
| Strength of Acid Taste | ± | ± | ± |
| Strength of Saltiness | ± | ± | ± |
| Strength of Bitterness | ± | ± | ± |
| Strength of Taste Intensity | ± | ± | ± |
| Flavor Enhancement |  |  |  |
| Fullness | +++ | ++++ | + |
| Extent | +++ | +++ | + |
| Duration of Taste | +++ | ++++ | + |

From the results of Table 5 and Table 6, it is clear that the products of this invention enhance the flavor only without enhancing the strength of any of odor, flavor, sweetness, saltiness, and bitterness.

EXAMPLE 2

500 g of peeled garlic was added to boiling water, heated for 60 minutes, then homogenized, boiled at 90° C. for 30 minutes, and thereafter the insoluble residue was removed by centrifugation to obtain about 3 l of a garlic extract.

This extract was adjusted to a solids concentration of 20% and a pH of 5.8, 500 ml of this extract was passed through a resin column packed with 500 ml of a strong-acid cation exchange resin "Dowex 50W×8" (produced by Dow Chemical Co.), further washed with 1,000 ml of water, and about 1,500 ml (pH 2.6) of the water washing of the non-adsorbed section was neutralized and freeze dried to obtain 81.67 g of a dry product. On the other hand, the adsorbed section was eluted with 0.1N sodium hydroxide until the pH of the desorption liquor became 13, then neutralized to pH 7.0, and freeze dried to obtain 2.69 g of a dry product.

The obtained dry product of the adsorbed component and the dry product of the non-adsorbed component were made into 0.1% aqueous solutions respectively, and they were organoleptically evaluated for the taste intensifying power and flavor enhancement by a profile method by an organoleptic panel consisting of 20 members. The results are given in Table 7.

TABLE 7

| Taste Enhancing Power* | Strength of Odor* | Analysis of Amino Acids | Components Presumed by NMR |
|---|---|---|---|
| Non-adsorbed Component (Control) | ± | + | — | Sugars & Organic acids |
| Adsorbed Component (Invention) | + | ± | Allillin & other Sulfur-containing Compds, Arg, Asp, Glu etc. | Amino acids & Peptides |

*Strength relative to the case where no sample was added.

EXAMPLE 3

1,400 ml (solids concentration of 5%) of a secondarily separated liquor of a garlic extract obtained by the same procedures and conditions as those in Example 1 was treated by a reverse osmosis membrane "T1 215" (produced by Teijin Engineering Co.), thereby 1,000 ml of an outer liquor was separated and removed, 1,000 ml of water was added to the obtained inner liquor, which was then dialyzed using a reverse osmosis membrane to remove 1,000 ml of an outer liquor, then 1,000 ml of water was again added to the obtained inner liquor. The respective outer liquor and inner liquor obtained by the above reverse osmosis membrane treatment were freeze dried to obtain 35 g of a dry product from the outer liquor and 35 g from the inner liquor.

Using the two kinds of the thus obtained dry products, organoleptic evaluation was conducted on (1) 0.2% aqueous solutions of the samples and (2) mixed aqueous solutions of 0.05% of the sample, 0.05% of MSG and 0.05% of IMP. The results are given in Table 9, from which it was found that the inner liquor (higher molecular weight compound section) possesses hardly any flavor enhancement imparting effect while the outer liquor (lower molecular weight compound section) has a flavor enhancement imparting effect.

TABLE 8

Results of Analysis of Extract, Outer Liquor and Inner Liquor

| Fraction | Ratio by weight (%) | T-N (%) | Total Sugar | Direct Sugar | Compounds Presumed by NMR | Threshold Value |
|---|---|---|---|---|---|---|
| Extract | 100 | 1.86 | 57.1 | 1.31 | | 10 ppm |
| Outer Liquor | 50 | 3.06 | 49.8 | — | Amino acids Sugars, Peptides, Organic acids | 10 ppm |
| Inner | 50 | 0.68 | 65.4 | 0.25 | Polysaccharides | |

TABLE 9

| | Simple Aqueous Solution Systems | | | Mixed Systems of MSG & IMP | | |
|---|---|---|---|---|---|---|
| | Flavor Intensity* | Flavor Enhancement* | Odor | Flavor Intensity* | Flavor Enhancement* | Odor* |
| Dry Product of Outer Liquor | ± | + | ± | ± | ++++ | ± |
| Dry Product of Inner Liquor | ± | ± | ++ | ± | ± | ++ |

*Strength relative to the case where the sample was not added.

EXAMPLE 4

3,000 ml of an outer liquor obtained by repeating reverse osmosis treatment three times by the same procedures and under the same conditions as those in Example 3 was subjected to adsorption resin treatment, concentration and freeze drying using 350 g of a strongly acidic cation exchange resin "Duolite C25-D" by the same procedures and the same conditions as those in Example 1 to obtain a sample (3.5 g). This was then made into a 0.2% aqueous solution and a mixed solution of 0.05% of MSG, 0.05% of IMP and 0.05% of the sample. Its organoleptic characteristics were evaluated to find that it has a flavor enhancement imparting effect similar to those of the products of this invention obtained in Examples 1, 2 and 3 and is not accompanied by the garlic odor.

EXAMPLE 5

500 g of garlic which had been peeled, chopped and allowed to stand in air for an hour was mixed with 2 l of water, boiled at 90° C. for 90 minutes, and thereafter the residue was removed by centrifugation to obtain about 2 l of an extract.

This extract was distilled by reduced pressure steam distillation (under conditions of 40 mmHg and 35° C.) until the distillate accumulated to about 20 l, to obtain 2.5 l of a deodorized liquor.

The degree of deodorization in this case was about 95% in the strength of odor as compared with the liquor before the deodorization (the result of the measurement of the point of subjective equality (PSE) relative to the original liquor), and thus it was possible to almost completely remove the odor.

The thus obtained freeze dried product of the deodorized liquor as compared with that (control) not subjected to the deodorizing treatment, i.e., obtained by merely freeze drying after the boiling and separation, manifested similar strong flavor enhancement in the system of 0.05% of MSG, 0.05% of IMP and 0.05% of the sample although its flavor was hardly noticeable.

TABLE 10

| | N = 10 | |
|---|---|---|
| | Control | Invention |
| Odor | +++ | ± |
| Strength of basic taste | ± | ± |
| Flavor Enhancement | +++ | +++ |

EXAMPLE 6

10 kg of a commercial garlic paste (produced by Iino Spice Co.) was mixed with 15 l of water, then boiled at 90° C. for 30 minutes, extracted, and the residue was removed by compression filtration to obtain about 19 l of an extract.

This extract was subjected to treatments similar to those in Example 1, i.e., this was adjusted to pH 1.0 with hydrochloric acid, and, after removing the residue containing acidic polysaccharides by filtration under pressure, was further subjected to adsorption resin treatment, neutralization, concentration, deodorization and drying to obtain 50 g of a white, almost odorless dry product.

The organoleptic characteristics of a 0.2% aqueous solution of the obtained dry product and a mixed solution of 0.05% of MSG, 0.05% of IMP and 0.05% of the dry product were evaluated, to confirm that it has a flavor enhancement imparting effect similar to those of the products of this invention obtained in Examples 1, 2, 3 and 4 without being accompanied by the garlic flavor.

EXAMPLE 7

Using the product of the invention (2) obtained in Example 1, Seasonings A–H were prepared by mixing the components according to the following formulations:

TABLE 11

| Seasoning | Product of the Invention (2) (g) | MSG (g) | Potassium L—Glutamate (g) | IMP (g) | GMP (g) |
|---|---|---|---|---|---|
| A | 50 | 50 | | | |
| B | 50 | | | 50 | |
| C | 50 | 25 | | 25 | |
| D | 50 | 49 | | 0.5 | 0.5 |
| E | 50 | 45 | | 2.5 | 2.5 |
| F | 70 | 15 | | 15 | |
| G | 10 | 40 | | 40 | |
| H | 50 | 15 | 10 | 25 | |

Seasonings A–H obtained above were used as samples, organoleptic evaluation was conducted on (1) a 0.2% aqueous solution of each sample and (2) a consomme soup of 0.3% of table salt and 0.05% of each sample in a bonito soup stock. The results are given in Table 12.

TABLE 12

| Seasoning | A | B | C | D | E | F | G | H |
|---|---|---|---|---|---|---|---|---|
| Simple Aqueous Solution System | | | | | | | | |
| Strength of Odor and Flavor | ← Comparable → | | | | | | | |
| Strength of Taste Intensity Flavor Enhancement | ++ | + | ++++ | +++ | +++ | +++ | ++++++ | ++++ |
| Fullness | + | + | ++++ | ++ | +++ | ++++ | ++++ | +++++ |
| Extent | + | ++ | ++++ | ++ | ++ | +++ | ++ | ++++ |
| Duration | + | ++ | ++++ | +++ | +++ | ++++ | +++ | ++++ |
| Consomme Soup System | | | | | | | | |
| Strength of Flavor | ← Comparable → | | | | | | | |
| Strength of Taste Intensity Flavor Enhancement | ± | ± | +++ | + | ++ | ++ | +++ | +++ |
| Fullness | + | + | +++ | ++ | ++ | +++ | +++ | ++++ |
| Extent | + | ++ | +++ | ++ | +++ | ++ | ++ | +++ |
| Duration | + | ++ | +++ | ++ | +++ | ++++ | ++ | +++ |
| Preference Ranking | 5 | 5 | 1 | 4 | 4 | 2 | 3 | 1 |

APPLICATION EXAMPLE 1

Seasonings C, E and F obtained in Example 7 and, as a control, a garlic extract obtained by the same procedures as those for the control section (1) in Example 1 were used as samples, each sample was added to curry prepared in the conventional manner, and organoleptically evaluated. The results are given in Table 13.

TABLE 13

(Strength relative to the case where the sample was not added)
N = 20

| | Garlic Extract (0.4% conc) | Seasoning C (0.2% conc) | Seasoning E (0.2% conc) | Seasoning F (0.2% conc) |
|---|---|---|---|---|
| Strength of Odor Flavor Original Taste | +++ | ± | ± | ± |
| Strength of Sweetness | + | + | ± | + |

TABLE 13-continued (Strength relative to the case where the sample was not added)
N = 20

| | Garlic Extract (0.4% conc) | Seasoning C (0.2% conc) | Seasoning E (0.2% conc) | Seasoning F (0.2% conc) |
|---|---|---|---|---|
| Strength of Acid Taste | ± | ± | ± | ± |
| Strength of Saltiness | ± | ± | ± | ± |
| Strength of Bitterness | ± | ± | ± | ± |
| Strength of Taste Intensity Flavor Enhancement | ± | ++ | + | + |
| Fullness | + | +++ | ++ | +++ |
| Extent | + | +++ | +++ | +++ |
| Duration | + | +++ | +++ | +++ |
| Preference | + | +++ | ++ | +++ |

APPLICATION EXAMPLE 2

Using as samples Seasoning C obtained in Example 7 (hereinafter referred to as (A)) and a garlic extract obtained by the same production process as that for the control section (1) (hereinafter referred to as (B)), boiled fish paste, sausage, soup and pickles, each containing the sample, were prepared in the conventional manner and organoleptically evaluated.

The organoleptic evaluation was conducted by a paired comparison test on two combinations (i.e. non-addition: (A) and non-addition: (B)) using non-added products as controls by choosing the stronger or more preferred of the two in each evaluation item given in the following tables (N=20). The results are given in Tables 14–17, from which it can be seen that the products to which the seasoning of this invention had been added had no garlic odor, were significantly distinguished for the strength of flavor enhancement and also were significantly favored in the total evaluation.

| Boiled Fish Paste Recipe | |
|---|---|
| Frozen ground fish | 100 (g) |
| Salt | 3.5 |
| "Mirin" (Japanese Sweet Sake) | 3.0 |
| Sugar | 1.0 |
| Starch | 5.0 |
| Egg white | 3.0 |
| Water | 7.5 |

-continued

| Boiled Fish Paste Recipe | |
|---|---|
| MSG | 0.5 |
| IMP | 0.5 |
| Sample | 1.0 |

TABLE 14

Results of Organoleptic Evaluation

| | A | | B | |
|---|---|---|---|---|
| | Non-Added | Added | Non-Added | Added |
| Strength of Odor & Flavor | 8 | 12 | 5* | 15 |
| Preference of Odor & Flavor | 9 | 12 | 14 | 6 |
| Strength of Sweetness | 11 | 9 | 7 | 13 |
| Strength of Saltiness | 8 | 12 | 12 | 8 |
| Strength of Taste Intensity | 7 | 13 | 9 | 11 |
| Strength of Flavor Enhancement | 2*** | 18 | 4** | 16 |
| Total Preference | 5* | 15 | 10 | 10 |

***Significantly different at a risk factor of 0.1%
**Significantly different at a risk factor of 1%
*Significantly different at a risk factor of 5%

| Sausage Recipe | |
|---|---|
| Pork | 100 (kg) |
| Lard | 10 |
| Starch | 4 |
| Water | 30 |
| MSG | 0.1 |
| IMP | 0.1 |
| Spice | 0.5 |
| Sample | 0.5 |

TABLE 15

Results of Organoleptic Evaluation

| | A | | B | |
|---|---|---|---|---|
| | Non-Added | Added | Non-Added | Added |
| Strength of Odor & Flavor | 9 | 11 | 4** | 16 |
| Preference of Odor & Flavor | 7 | 13 | 10 | 10 |
| Strength of Sweetness | 10 | 10 | 8 | 12 |
| Strength of Saltiness | 9 | 11 | 9 | 11 |
| Strength of Taste Intensity | 8 | 12 | 9 | 11 |
| Strength of Flavor | 3** | 17 | 5* | 15 |
| Total Preference | 4* | 16 | 9 | 11 |

**Significantly different at a risk factor of 1%.
*Significantly different at a risk factor of 5%.

| Soup Recipe | |
|---|---|
| Salt | 10.25 (g) |
| MSG | 0.93 |
| "WP" (5'-ribonucleotide salt, produced by Ajinomo Co.) | 0.023 |
| Beef extract | 2.33 |
| Beef fat | 2.1 |
| Spice | 0.4 |
| Lactose | 5.97 |
| Water | 1000 |
| Sample | 0.22 |

TABLE 16

Results of Organoleptic Evaluation

| | A | | B | |
|---|---|---|---|---|
| | Non-Added | Added | Non-Added | Added |
| Strength of Odor & Flavor | 10 | 10 | 4** | 16 |
| Preference of Odor & Flavor | 8 | 12 | 6 | 14 |
| Strength of Sweetness | 12 | 8 | 8 | 12 |
| Strength of Saltiness | 9 | 11 | 10 | 10 |
| Strength of Taste Intensity | 8 | 12 | 9 | 11 |
| Strength of Flavor Enhancement | 1*** | 19 | 5* | 15 |
| Total Preference | 3** | 17 | 5* | 15 |

***Significantly different at a risk factor of 0.1%.
**Significantly different at a risk factor of 1%.
*Significantly different at a risk factor of 5%.

| Pickles Recipe | |
|---|---|
| Water washed, desalted cucumber | 100 (kg) |
| Amino acid liquor | 16.2 |
| MSG | 2 |
| Sorbitol | 2 |
| Sweet sake | 24 |
| Citric acid | 0.3 |
| 50% Lactose | 0.65 |
| Salt | 1.2 |
| Water | 23.65 |
| Sample | 1.0 |

TABLE 17

Results of Organoleptic Evaluation

| | A | | B | |
|---|---|---|---|---|
| | Non-Added | Added | Non-Added | Added |
| Strength of Odor & Flavor | 7 | 13 | 3** | 17 |
| Preference of Odor & Flavor | 12 | 8 | 14 | 6 |
| Strength of Sweetness | 12 | 8 | 7 | 13 |
| Strength of Saltiness | 11 | 9 | 11 | 9 |
| Strength of Taste Intensity | 8 | 12 | 10 | 10 |
| Strength of Flavor Enhancement | 4** | 16 | 6 | 14 |
| Total Preference | 9 | 11 | 7 | 13 |

**Significantly different at a risk factor of 1%.

What is claimed as new and desired to be secured by Letters Patent of the United States is:

1. A process for the production of a flavor enhancing seasoning, comprising:
   (i) extracting garlic with water after suppression of enzymatic activity, to obtain an extract, wherein said enzymatic activity is suppressed by heating said garlic at a temperature of at least 80° C. for at least 30 minutes;
   (ii) deodorizing said extract to obtain an almost odorless material; and
   (iii) adding a glutamic acid salt, a 5'-ribonucleotide salt, or a glutamic acid salt and a 5'-ribonucleotide salt to said deodorized extract;
   wherein said extract is used in an amount of 5 wt.% or more relative to the weight of said glutamic acid salt, said 5'-ribonucleotide salt, or said glutamic acid salt and 5'-ribonucleotide salt.

2. The process of claim 1, comprising concentrating the said deodorized extract prior to step (iii).

3. The process of claim 1, comprising suppressing the said enzymatic activity by blanching the garlic by heating the same prior to extraction with water.

4. The process of claim 3, comprising chopping the said garlic as a whole not more than 6 hours prior to blanching.

5. The process of claim 3, comprising chopping the said garlic as a whole and immediately thereafter maintaining the said chopped garlic in chilled or frozen condition.

6. The process of claim 1, wherein the said deodorizing treatment comprises one or more treatments selected from resin treatments, membrane treatments, and steam distillations.

7. The process of claim 6, wherein the said resin treatment is effected using a free-form cationic exchange resin, a porous resin, or a free-form cationic exchange resin and a porous resin.

8. The process of claim 6, wherein the said extract is brought into contact with a strong-acid cationic exchange resin to obtain an absorption liquor.

9. A flavor enhancing seasoning, obtained by a process comprising:
(i) extracting garlic with water after suppression of enzymatic activity, to obtain an extract, wherein said enzymatic activity is suppressed by heating said garlic at a temperature of at least 80° C. for at least 30 minutes;
(ii) deodorizing said extract to obtain an almost odorless material; and
(iii) adding a glutamic acid salt, a 5'-ribonucleotide salt, or a glutamic acid salt and a 5'-ribonucleotide salt to said deodorized extract;
wherein said extract is used in an amount of 5 wt.% or more relative to the weight of said glutamic acid salt, said 5'-ribonucleotide salt, or said glutamic acid salt and 5'-ribonucleotide salt.

10. The flavor enhancing seasoning of claim 9, wherein the said seasoning is in the form of aqueous solution, paste, powder or granules.

11. The flavor enhancing seasoning of claim 9, wherein said deodorized extract is concentrated prior to step (iii).

12. The flavor enhancing seasoning of claim 9, wherein said deodorizing treatment comprises one or more treatments selected from resin treatments, membrane treatments and steam distillations.

13. The flavor enhancing seasoning of claim 12, wherein said resin treatment is effected using a free-form cationic exchange resin, a porous resin, or a free-form cationic exchange resin and a porous resin.

* * * * *